Figure 1:
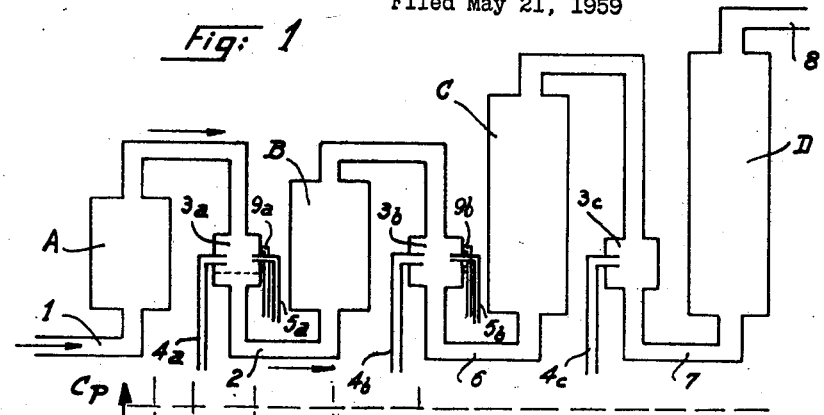

3,072,682
PRODUCTION OF PHTHALIC ANHYDRIDE
Samuel Benichou, Casablanca, Morocco, and Norbert Roger Beyrard, Paris, and Georges David Benzimra, Neuilly-sur-Seine, France, assignors to Societe d'Etudes de Techniques Industrielles Nouvelles, Paris, France, a company of France
Filed May 21, 1959, Ser. No. 814,697
Claims priority, application France May 23, 1958
2 Claims. (Cl. 260—346.4)

This invention relates to a process for the catalytic oxidation of aromatic hydrocarbons.

It is known that many complex chemical products can be obtained by partially oxidizing hydrocarbons in the presence of a catalyst. For this purpose, the oxidizing agent employed is generally atmospheric air and the mixture of air and gaseous hydrocarbon, or hydrocarbon in the vapour phase is brought into contact with the catalyst in a chamber or in a succession of chambers.

Since hydrocarbons form explosive mixtures with air, it is essential that the quantity of hydrocarbon added to a given volume of air for treatment by the catalyst should be lower than a critical value called the "explosion threshold," this value depending upon the hydrocarbon treated.

Since the explosion threshold is usually of the order of several tens of grams per cubic metre, the dilution of the hydrocarbon in the air is necessarily very considerable; in other words, the reaction takes place in the presence of a very large excess of air, generally about ten times the quantity of air strictly necessary for the desired partial oxidizing reaction.

Under these conditions, the variation of the concentration of oxygen in the mixture in the course of the reaction may be regarded as negligible, so that the only variation of concentration which controls the speed of reaction is that of the hydrocarbon.

In practice, therefore, the reaction is of the type known as a first order reaction, of which the speed V is governed by the differential equation:

$$V = \frac{dx}{dt} = K(a-x)$$

in which equation:

$x$ is the number of hydrocarbon molecules oxidized after time $t$.
$a$ the number of hydrocarbon molecules initially present, and
$K$ is a coefficient which depends upon the reaction envisaged, upon the temperature, upon the nature of the catalyst, and on other factors.

In other words, the speed of the reaction from the initial instant decreases as the term $a-x$ decreases, that is to say, in proportion as the effectively oxidized hydrocarbon becomes greater.

However, reactions for the oxidation of hydrocarbons are always highly exothermic and they consequently tend to raise the temperature of the mixture. Now, a particular oxidation product can be produced in the presence of a particular catalyst only within narrow temperature limits.

Generally speaking, insufficiently oxidized products are obtained below the lower limit, while above the limit the degree of over-oxidation may be such that the hydrocarbon molecules are entirely destroyed, so that the oxidation products are simply water and carbon dioxide or even carbon monoxide.

In order to maintain the reactive mixture constantly between these temperature limits, it has already been proposed to fractionate the reaction into a number of successive stages, in the course of each of which the temperature is controlled and maintained between the necessary limits by appropriate cooling means.

In this case, the mass of catalyst is distributed in a number of successive chambers, in which the temperature is maintained at a predetermined value, the mixture being delivered from the outlet of one chamber to the inlet of the following chamber through a connecting duct.

However, owing to their partial oxidation, the product or products obtained in the course of the reaction are distinctly less inflammable than the original hydrocarbon, so that the further the reaction progresses the more is the danger of explosion diminished.

The invention utilizes these various considerations to increase the output of installations for the catalytic oxidation of hydrocarbon in the presence of air or, more generally, of gaseous mixtures containing a known proportion of oxygen.

In accordance with the present invention, there is provided a process for the catalytic oxidation of hydrocarbons which comprises subjecting a mixture of hydrocarbon and oxygen-containing gas, in proportions below the explosion threshold to catalytic oxidation in a plurality of stages and injecting into the mixture between the successive oxidation stages a further quantity of hydrocarbon, so as to compensate at least partially for the reduction in the hydrocarbon concentration, while keeping it below the critical explosion threshold.

In an advantageous embodiment of the invention, the multi-stage process is carried out by causing the mixture to flow through a series of catalyzing chambers and the injection of further hydrocarbon is effected in the duct connecting successive catalyzing chambers, and substantially at the same time a cooling agent (preferably consisting of water in the liquid state) is injected. This latter by evaporation, lowers the temperature of the mixture issuing from one chamber before it enters the succeeding chamber.

This simultaneous injection affords the advantage that simultaneously with the increase in the concentration of the hydrocarbon, the mixture is cooled, whereby the danger of explosion is further diminished. Moreover, the degree of dilution of the hydrocarbon increases as a result of the vaporization of the liquid coolant (e.g. in the formation of steam) which is also a favourable factor for avoiding explosions.

Finally, in order further to diminish the risks of explosion due to local increase in the concentration of hydrocarbon in the neighborhood of the point of injection of the latter, it is possible at the same time to inject a quantity of cold air, preferably through injection nozzles surrounding the orifice for the injection of hydrocarbon.

In the following description of the invention reference is made more particularly to the specific case of oxidizing naphthalene in the presence of vanadium oxide (or molybdenum oxide) to produce phthalic anhydride. However, it is to be understood that this process is applicable to the oxidation of all kinds of hydrocarbons capable of giving oxidation products in the presence of catalysts.

The invention will now be described with reference to the accompanying drawings, which however are not to be regarded as limiting the invention. In the drawings.

Figure 2:
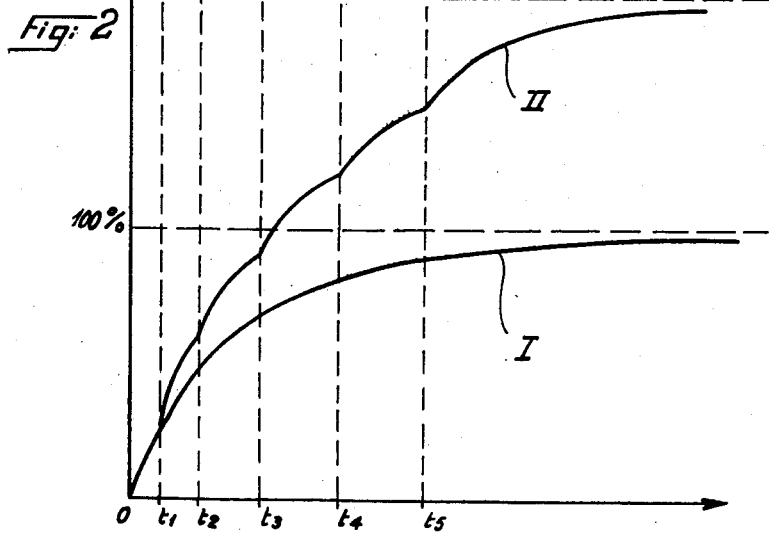
Figure 3:
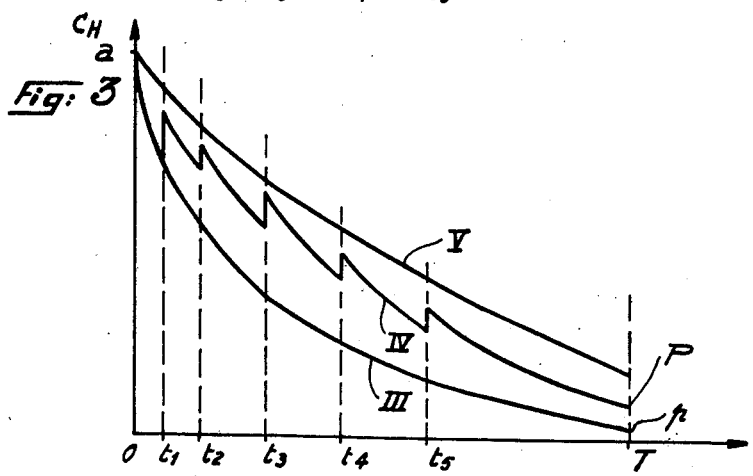

FIGURE 1 is a diagrammatic illustration of an oxidizing installation according to the invention; and FIGURES 2 and 3 are explanatory diagrams.

In FIGURE 1, a mixture of air and hydrocarbon, for example a mixture of air and naphthalene (in the proportion of 35 g. of naphthalene to 1 cubic metre of air) is fed at a temperature of about 350° C. through the duct 1 into a first chamber A.

This chamber contains a predetermined quantity of catalyst (vanadium oxide or molybdenum oxide), which effects the oxidation of a part of the naphthalene to give phthalic anhydride, which at the same time increases the temperature of the mixture to about 370–400° C.

On leaving the said chamber A, the mixture is conducted through the duct 2 to a second chamber which also contains a predetermined quantity of catalyst. Disposed within the duct 2 is a diffuser 3a, into which are fed, through the duct 4a, water in the liquid state and, through the duct 5a, a predetermined quantity of naphthalene. The orifice of the last-mentioned duct may be surrounded by air admission nozzles 9a permitting a rapid dilution of the naphthalene for the purpose of avoiding a local excess of concentration of the latter.

The chamber B thus receives a mixture which is again enriched in naphthalene and cooled by evaporation to approximately the initial temperature.

The oxidation continues in the chamber B and, from there, the mixture passes to the chamber C by way of the duct 6, which also comprises a diffuser 3b, into which water, naphthalene and air are fed through the ducts 4b, 5b and 9b.

The chamber C is succeeded by a chamber D, into which the mixture flows through the duct 7 comprising the diffuser 3c, into which opens the single duct 4c for the admission of water intended to cool the mixture.

The chamber D, which may optionally be succeeded by other chambers, which may be of increasing dimensions, is intended for the substantially complete exhaustion of the naphthalene.

The duct 8 leads from the outlet of the last-mentioned chamber to a known device for collecting the oxidized products, for example condensation chambers or a washing tower.

In addition, the number of successive chambers such as A, B and C which receive an enriched mixture may be much greater than that shown in FIGURE 1.

The diagrams of FIGURES 2 and 3 illustrate the benefit afforded by the process of the invention.

If the previously indicated differential equation $$\frac{dx}{dt} = K(a-x)$$

is integrated, the following is found, taking into account the initial conditions ( $t=0$, $x=0$ )

$$\ln\frac{a}{a-x} = Kt$$

This law of variation is represented in FIGURE 2 by the curve I, in which the time $t$ is plotted along the abscissae and the concentration $C_P$ of obtained product is plotted along the ordinates.

It is only after a theoretically infinite time that all the initial hydrocarbon $a$ has been converted into oxidized products (100%).

However, if, in the course of the reaction, i.e. at the time $t_1, t_2, t_3 \ldots t_5 \ldots$, further hydrocarbon is injected into the mixture, the curve I becomes the curve II, that is to say, at the end of the oxidation there is obtained a quantity of oxidized product greater than that corresponding to 100% of the conversion of the quantity of initially injected product.

This result is obtained without any modification to the existing installation, that is to say, with the same quantity of catalyst and with the same initial energy intended for the compression and the heating of the air employed.

The increase in yield is obtained at the cost of the injection of a relatively small quantity of hydrocarbon, of which the market value is substantially negligible as compared with the cost of the installation itself, the replacement of the catalyst and the energy initially introduced.

FIGURE 3 shows the variation of the quantity of naphthalene or more generally of hydrocarbon in the reacted mixture.

Without re-injection of naphthalene, this quantity varies in the time $t$ in accordance with the curve III from the initially injected quantity $a$. With re-injection at the times $t_1, t_2, t_3$, etc., this change is that indicated by the curve IV.

Since the oxidation product (phthalic anhydride in the present instance), although being less inflammable than naphthalene, reduces in proportion as it is formed the quantity of naphthalene which can be contained in the mixture without danger of explosion, the curve IV must be situated entirely below the curve V, which corresponds to the explosion threshold of the ternary mixture of air, phthalic anhydride and naphthalene. If the product of the reaction were entirely non-inflammable, this curve would correspond to the horizontal extending through $a$.

In particular in the case of the production of phthalic anhydride from naphthalene, it is known that the inflammability threshold of naphthalene at 350° C. is 3.2 g. per 100 g. of dry air, while the inflammability threshold of anhydride is 4.7 g. under the same temperature conditions and with the same quantity of air. In this case, it would be possible to convert with the same installation a quantity of naphthalene greater by at least 20% than the normal quantity (it having to be borne in mind that one gram of naphthalene gives 1.15 g. of anhydride).

In practice, when the water is injected, whereby the partial pressure of the naphthalene is lowered, and taking into account the fact that an appreciable quantity of naphthalene is completely destroyed in each catalyst stage (from 3% to 10% of the quantity converted into anhydride), it is possible greatly to increase the quantity of naphthalene injected between two stages and thus to increase the production capacity of the installation by 30–35%.

It will be noted that the case mentioned is one of the least favourable having regard to the high inflammability of the oxidized product.

The diagram of FIGURE 3 also shows that the loss of hydrocarbon at the end of the reaction (time T), which corresponds to the ordinate of the point P, is simply of the order of twice or at most three times the loss of hydrocarbon which must be accepted (ordinate of the point p) when no successive re-injections of hydrocarbon are effected.

We claim:

1. A method of oxidizing naphthalene to phthalic anhydride comprising: the subjection of a mixture of naphthalene and air to a series of separate, oxidation steps; maintaining the conditions of each of said oxidation steps within a predetermined temperature range by cooling, after each oxidation step and before the next, the products of the preceding oxidation step to a temperature above the condensation temperature of the phthalic anhydride formed during such preceding oxidation step but below the explosion level of such products, while adding unreacted naphthalene to such products and thereafter subjecting to further oxidation steps the cooled product of said previous oxidation step and said additional naphthalene.

2. A method of oxidizing naphthalene into phthalic anhydride which comprises passing a mixture of naphthalene and air through a series of oxidation reactions; maintaining each such reaction within a temperature range, at the start, of about 350° C. to a final temperature of about 400° C.; cooling the mixture at the end of each step to the lower value of said range; injecting fresh naphthalene into the mixture between successive steps, the amount of naphthalene injected at each injection point being so adjusted as to raise the naphthalene content at such point to a concentration below the explosion threshold of the reacting mixture containing air, naphthalene and phthalic anhydride, and circulating said reacting mixture containing the phthalic anhydride produced through the succeeding oxidation steps.

References Cited in the file of this patent
UNITED STATES PATENTS

| | | |
|---|---|---|
| 1,374,722 | Downs | Apr. 12, 1921 |
| 1,789,809 | Downs | Jan. 20, 1931 |
| 1,844,395 | Jaeger | Feb. 9, 1932 |
| 2,474,583 | Lewis | June 28, 1949 |
| 2,660,032 | Rosenthal | Nov. 24, 1953 |
| 2,815,352 | Johannsen | Dec. 3, 1957 |